United States Patent [19]

Braun

[11] Patent Number: 5,358,457
[45] Date of Patent: Oct. 25, 1994

[54] TWIN PINION AXLE ASSEMBLY
[75] Inventor: Eugene R. Braun, Royal Oak, Mich.
[73] Assignee: Eaton Corporation, Cleveland, Ohio
[21] Appl. No.: 994,245
[22] Filed: Dec. 21, 1992
[51] Int. Cl.$^5$ .............................................. F16H 1/38
[52] U.S. Cl. ................................................. 475/225
[58] Field of Search ........................................ 475/225

[56] References Cited

U.S. PATENT DOCUMENTS

| | | | |
|---|---|---|---|
| 1,419,240 | 6/1922 | Dunham | 475/225 |
| 1,433,575 | 10/1922 | Taylor et al. | 475/225 |
| 1,456,399 | 5/1923 | Pescara | 475/225 |
| 1,502,090 | 7/1924 | Daimler | 475/225 |
| 1,705,111 | 3/1929 | Goodrich | 475/225 |
| 1,866,656 | 7/1932 | Ledwinka | 475/225 |
| 1,920,175 | 8/1933 | Hollos | 475/225 |
| 2,276,663 | 3/1942 | Mercier | 475/225 |
| 2,494,217 | 1/1950 | Watson | 475/225 |
| 3,374,687 | 3/1968 | Vost | 74/417 |
| 4,266,436 | 5/1981 | Reppert | 74/395 |
| 4,297,907 | 11/1981 | Bossler, Jr. et al. | 74/417 |
| 4,432,431 | 2/1984 | Russell | 180/248 |

Primary Examiner—Dirk Wright
Attorney, Agent, or Firm—L. J. Kasper

[57] ABSTRACT

An axle assembly (11) is provided of the type including independent co-axial first (95) and second (103) axle shafts driven by first (89) and second (91) ring gears in mesh, respectively, with first (73) and second (75) drive pinion gears. The assembly includes a differential (23) including a first side gear (31) which drives the pinion gear (73), and a second gear (37) which drives the pinion gear (75). The assembly defines a pair of torque paths which are arranged generally in a mirror image about an axis of rotation (A) of the axle shafts. The differential (23) can be smaller and less expensive because it is located on the "low-torque" upstream side of the pinion gear-ring gear reductions. By dividing total drive torque into two parallel torque paths, each pinion gear and ring gear, and their associated bearings can be substantially smaller and less expensive. Finally, the arrangement disclosed makes it possible to have a number of differential gear mesh frequencies, each transmitting only one-half of the total torque, resulting in substantially reduced noise generation.

21 Claims, 4 Drawing Sheets

TWIN PINION AXLE ASSEMBLY

BACKGROUND OF THE DISCLOSURE

The present invention relates to axle assemblies for driving a pair of independently rotatable axle shafts, and more particularly, to such an arrangement of the type in which differential gear means are provided to permit rotation of the axle shafts at different rotational speeds.

The present invention will be illustrated and described in connection with an axle assembly which is intended to be the rear-rear axle of a tandem axle arrangement. A "tandem" axle arrangement is one having two separate axle assemblies, for example, toward the rear end of the vehicle, wherein one axle assembly follows the other, in the direction of movement of the vehicle. However, those skilled in the art will understand that the present invention is not limited to use in an axle assembly which is part of a tandem axle arrangement, but may be used in any axle assembly, including independently rotatable, generally co-axial axle shafts, each shaft being driven by a separate ring gear.

U.S. Pat. No. 4,432,431, assigned to the assignee of the present invention and incorporated herein by reference, illustrates a typical front-rear axle assembly for use as part of a tandem axle arrangement. For purposes of understanding the present invention, and the background thereof, the device illustrated in the above-incorporated patent is relevant because it illustrates the conventional arrangement of such axles. In the conventional axles, a relatively high-speed, low-torque input is transmitted to a drive pinion which is in engagement with a ring gear. The ring gear transmits a relatively low-speed, high-torque motion to the input of an inter-wheel differential, which includes a pair of output side gears, each of which transmits one-half of the total output torque to each of the axle shafts.

Although such axle assemblies have been in widespread commercial use, and have been generally satisfactory in performance, such axles, having the overall configuration described above, have certain disadvantages. In the configuration described, the total drive torque, to be delivered to the wheels, is transmitted through a single ring gear, thus requiring that ring gear to be quite large and expensive. As a related point, the bearing sets which support that particular ring gear within the axle housing are also required to be quite large and expensive. Finally, the inter-wheel differential is subjected to the full driving torque (being disposed downstream of the drive pinion-ring gear reduction), thus requiring a larger, much more expensive differential gear set.

Accordingly, it is an object of the present invention to provide an axle assembly in which it is possible to use a smaller, less expensive, inter-wheel differential gear set.

It is a related object of the present invention to provide such an axle assembly in which it is possible to use ring gears and bearing sets which are smaller and less expensive than in the conventional axle assembly described above.

It is a further related object of the present invention to provide an axle assembly having a configuration whereby it is possible to reduce the overall axle package size, thus making it possible, where desired, to increase the ground clearance of the axle assembly.

It is another object of the present invention to provide an axle assembly which is capable of being substantially quieter than the conventional, prior art device by not transmitting the total drive torque through a single gear mesh.

U.S. Pat. No. 3,105,395, assigned to the assignee of the present invention, and incorporated herein by reference, illustrates a device known in the art as a "twin countershaft" transmission. The above-incorporated patent illustrates the basic concept of "torque-sharing", i.e., transmitting a particular drive torque through a device by means of two parallel torque paths, each transmitting approximately one-half of the total torque, rather than transmitting all of the torque through a single path, as was conventional. Among the related advantages of a "twin countershaft" type of device is the ability to balance various torques and reaction forces which exist in the device.

Although the advantages of the "torque sharing" principle used in twin countershaft transmissions have long been recognized, those skilled in the axle art have been previously unable to provide a practical, commercially satisfactory axle assembly utilizing the torque-sharing principle used in twin countershaft transmissions.

Accordingly, it is an object of the present invention to provide an axle assembly which utilizes the torque-sharing principles of twin countershaft devices, and which has the performance benefits inherent in twin-countershaft devices, as described above.

The above and other objects of the present invention are accomplished by the provision of an axle assembly of the type including independently rotatable, generally co-axial first and second axle shafts. First and second ring gear means are operable to drive the first and second axle shafts, respectively. First and second drive pinion gears are in meshing engagement with the first and second ring gear means, respectively. Included is a differential gear means having at least one input pinion gear in driven relationship with an input means, and first and second output gears in meshing engagement with the input pinion gear. The first output gear is operable to transmit torque to the first drive pinion gear, and the second output gear is operable to transmit torque to the second drive pinion gear.

In accordance with a more detailed aspect of the present invention, the first output gear transmits torque to the first drive pinion gear through a first parallel axis gear set, and the second output gear transmits torque to the second drive pinion gear through a second parallel axis gear set, the first and second parallel axis gear sets being substantially identical, and being arranged generally in a mirror image relative to an axis of rotation defined by the first and second axle shafts.

In accordance with a still further aspect of the present invention, the first output gear, the first drive pinion gear, the first ring gear means, and the first axle shaft define a first torque path. Similarly, the second output gear, the second drive pinion gear, the second ring gear means, and the second axle shaft define a second torque path. The first and second torque paths are arranged generally in a mirror image relative to an axis of rotation defined by the axle shafts.

DESCRIPTION OF THE PREFERRED EMBODIMENT

Figure 1:
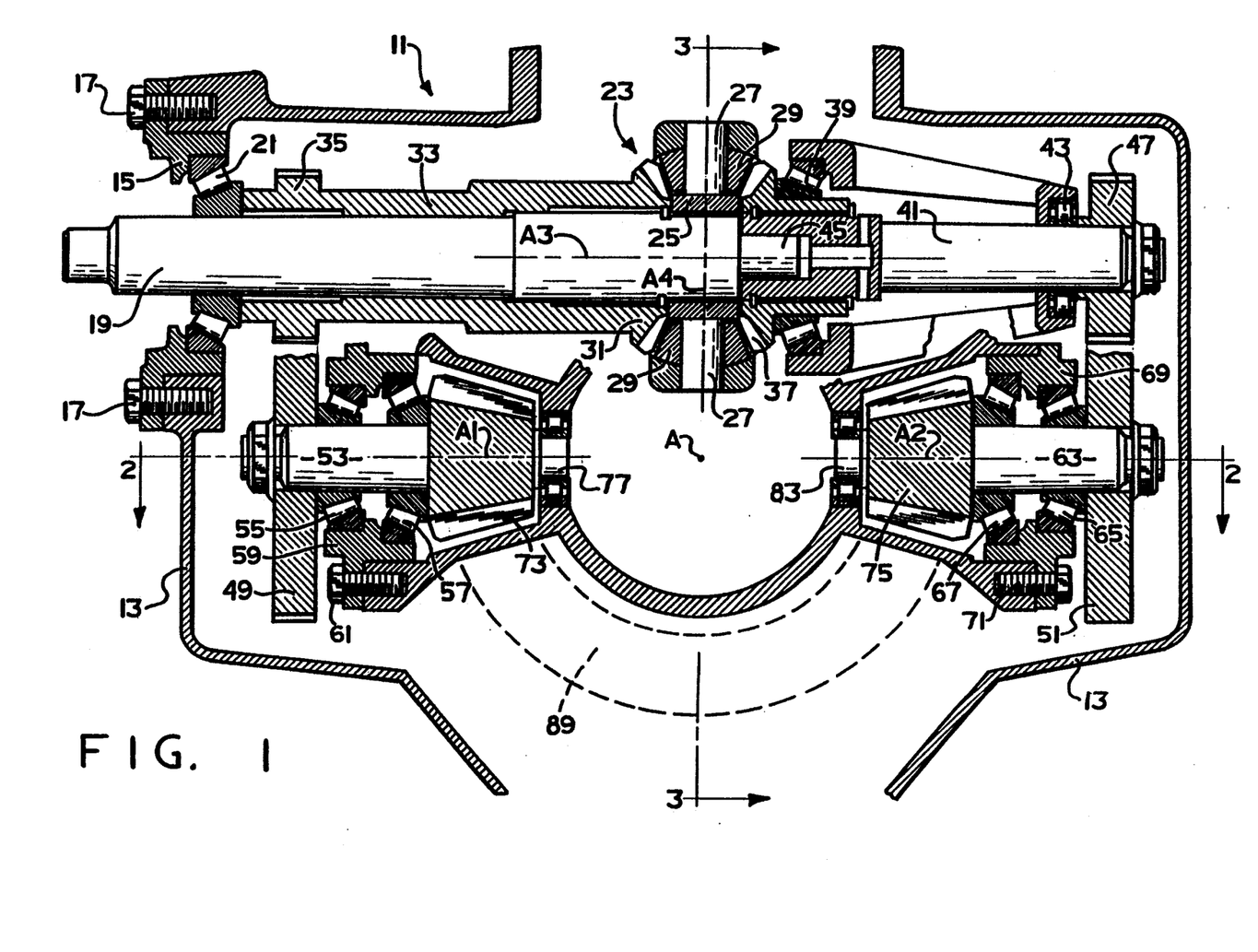
FIG. 1 is a vertical, axial cross-section, of an axle assembly made in accordance with the present invention.

Referring now to the drawings, which are not intended to limit the invention, FIG. 1 illustrates a preferred embodiment of an axle assembly, generally designated 11, of the type which may comprise the rear-rear axle of a tandem rear axle arrangement. Such an arrangement would typically be used to transmit engine torque from the transmission to the rear drive wheels of a vehicle such as a class 8 truck.

Figure 2:
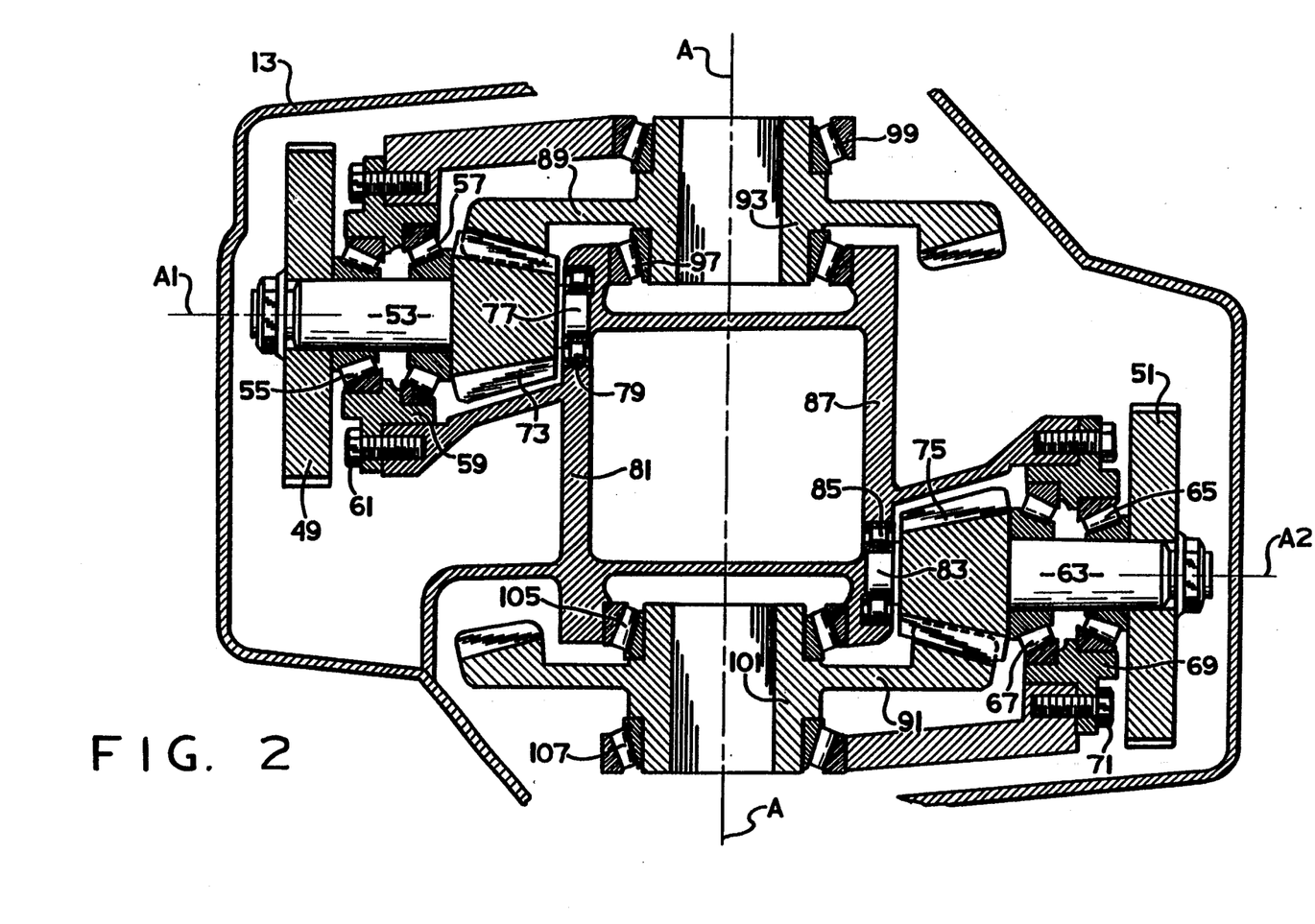
FIG. 2 is a horizontal, axial cross-section, taken on line 2—2 of FIG. 1, and on the same scale.
Figure 3:
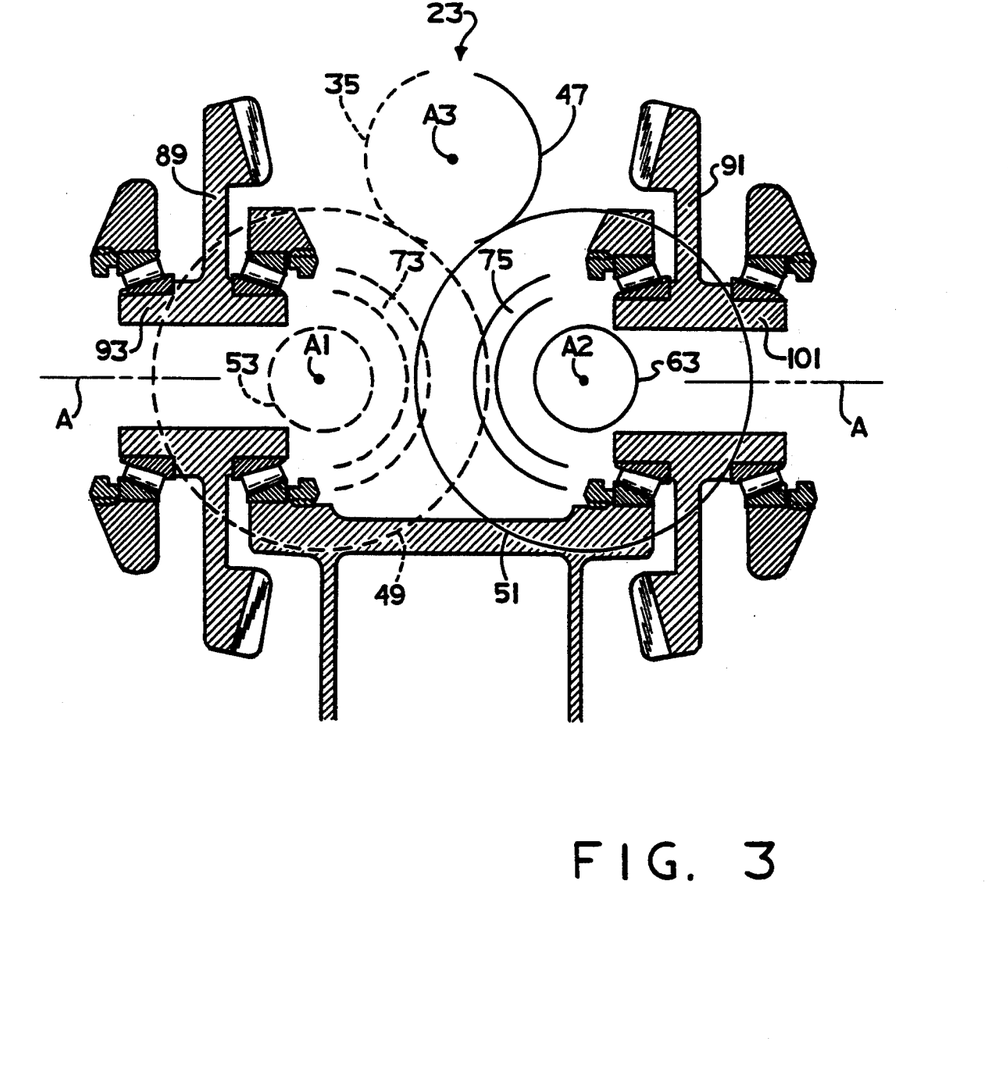
FIG. 3 is somewhat schematic transverse cross section, taken generally on line 3—3 of FIG. 1, and on the same scale.

It should be understood by those skilled in the art that in both FIGS. 1 and 2, various parts are omitted from the drawings, primarily to avoid confusion by having some parts showing in the background, partially hidden by certain other parts which are shown in the foreground. In addition, FIG. 3 is illustrated as being taken on line 3—3 of FIG. 1, primarily because FIG. 3 is drawn as though taken on the axis of rotation of the ring gears and axle shafts. However, those skilled in the art will understand that the parts shown in FIG. 3 in dotted line are included for illustration purposes, even though such parts would be "behind" the plane of FIG. 3, i.e., toward the forward end (left end) of the axle assembly in FIG. 1.

The axle assembly 11 includes an axle housing 13 and a front bearing retainer plate 15. The retainer plate 15 is bolted to the axle housing 13 by means of a plurality of bolts 17. An input shaft 19 extends axially through the retainer plate 15, and is rotatably supported relative to the axle housing 13 by means of a bearing set 21, the bearing set 21 being pressed into a cylindrical opening defined by the retainer plate 15. The rearward end (right end in FIG. 1) of the input shaft 19 extends into an interwheel differential set, generally designated 23.

The differential 23 includes a pinion yoke 25, which is preferably in splined engagement with the portion of the input shaft 19 which extends through the yoke 25. The pinion yoke 25 includes a pair of diametrically-opposed stub shafts 27, with an input pinion gear 29 being rotatably disposed on each of the shafts 27, as is generally well known in the differential art.

Both of the input pinion gears 29 are in meshing engagement with a side gear 31, which is formed at the rearward end of a forward output shaft 33. As may best be seen in FIG. 1, the forward output shaft 33 is hollow, receives the input shaft 19 extending therethrough, and is substantially concentric with the input shaft 19. The forward end of the forward output shaft 33 is disposed adjacent the inner race of the bearing set 21. Fixed relative to the shaft 33, and preferably integral therewith, is a spur gear 35, the function of which will be described subsequently.

The input pinion gears 29 are also in meshing engagement with a side gear 37, which is rotatably supported relative to the axle housing 13 by means of a bearing set 39. The side gear 37 is in splined engagement with a rearward output shaft 41, the rearward end of which is rotatably supported relative to the axle housing 13 by means of a bearing set 43. The forward end of the rearward output shaft 41 comprises a relatively enlarged portion, defining a pilot bore which receives and pilots therein a pilot portion 45, extending from the rearward end of the input shaft 19. In splined engagement with the rearward end of the rearward output shaft 41 is a spur gear 47 which, in the subject embodiment, is the same as the spur gear 35, in terms of number of teeth, pitch diameter, etc.

Although the inter-wheel differential 23 has been illustrated herein as an "open" differential, partly for ease of illustration, those skilled in the art will understand that the invention is not so limited. Within the scope of the present invention, the inter-wheel differential 23 could include some means to limit differentiation between the side gears 31 and 37. By way of example only, one of the outputs could be "lockable" relative to the input, as is illustrated and described in above-incorporated U.S. Pat. No. 4,432,431.

Referring now to FIGS. 2 and 3, in conjunction with FIG. 1, the spur gear 35 is in meshing engagement (FIG. 3) with a relatively larger forward spur gear 49, while the spur gear 47 is in meshing engagement (FIG. 3) with a relatively larger, rearward spur gear 51. The forward spur gear 49 is in splined engagement with a forward pinion shaft 53, which is rotatably supported relative to the axle housing 13 by means of a pair of tapered roller bearings 55 and 57, the bearings 55 and 57 being pressed into an annular housing insert 59. The insert 59 is bolted to the axle housing 13 by means of a plurality of bolts 61. Similarly, the rearward spur gear 51 is in splined engagement with a rearward pinion shaft 63, which is rotatably supported relative to the axle housing 13 by means of a pair of tapered roller bearings 65 and 67. The bearings 65 and 67 are pressed into an annular housing insert 69, the insert 69 being attached to the axle housing 13 by means of a plurality of bolts 71.

The forward pinion shaft 53 has a pinion gear 73 which, preferably, is formed integral with the shaft 53. Similarly, the rearward pinion shaft 63 has a pinion gear 75, preferably formed integral with the shaft 63. As may best be seen in FIGS. 1 and 2, the rearward end of the forward pinion shaft 53 includes a terminal portion 77 which is rotatably supported by a bearing set 79. The bearing set 79 is pressed into a transverse wall 81, which preferably is cast integrally with the axle housing 13. Similarly, the forward end of the rearward pinion shaft 63 includes a terminal portion, 83, which is rotatably supported by a bearing set 85, and the bearing set 85 is pressed into a transverse wall 87 which, preferably, is cast integrally with the axle housing 13.

Referring now primarily to FIG. 2, the forward pinion gear 73 is in meshing engagement with a ring gear 89, while the rearward pinion gear 75 is in meshing engagement with a ring gear 91. The ring gear 89 includes a hub portion 93, which preferably defines a set of internal splines for splined engagement with an axle shaft 95 (shown only in FIG. 4). The hub portion 93 is rotatably supported relative to the axle housing 13 by means of a pair of tapered roller bearing sets 97 and 99. Similarly, the ring gear 91 includes a hub portion 101 which, preferably, defines a set of internal splines adapted for splined engagement with an axle shaft 103 (shown only in FIG. 4). The hub portion 101 is rotatably supported relative to the axle housing 13 by means of a pair of tapered roller bearing sets 105 and 107.

Operation

Figure 4:
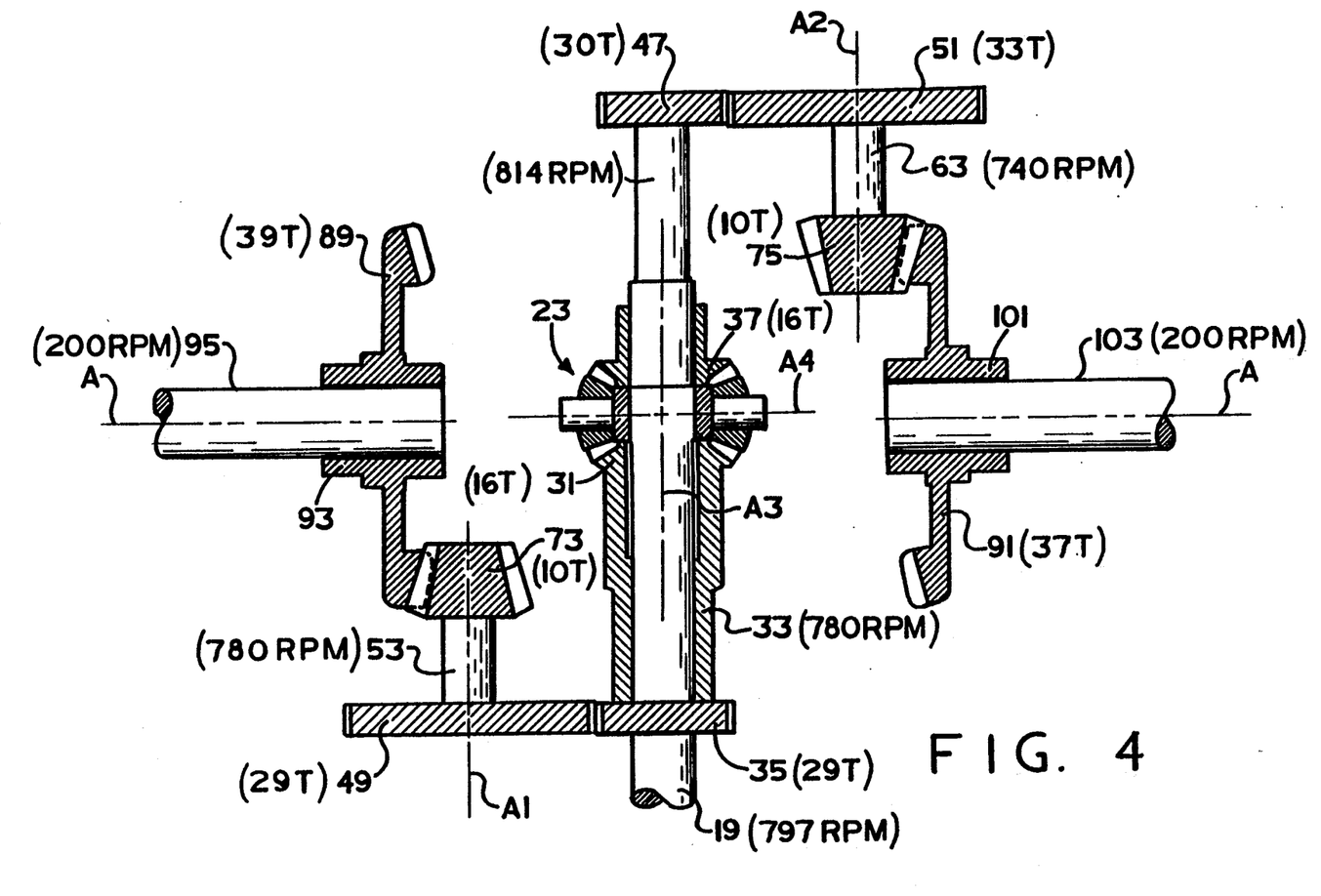
FIG. 4 is a simplified, schematic view of the axle assembly of the present invention, and is included primarily to illustrate conceptual and spatial relationships of the present invention.

Referring now to FIG. 4, in conjunction with FIGS. 1 through 3, the operation of the axle assembly of the present invention will be described. The primary purpose of FIG. 4 is to show the axle assembly of the present invention in a somewhat simplified, schematic manner. Although somewhat schematic, FIG. 4 does accurately illustrate various conceptual and spatial relationships which are an important part of the present invention, but which may not be clearly understood from FIGS. 1 through 3. In FIG. 4, for each gear there is a designation, in parenthesis, of the number of teeth, and for each shaft, there is a designation, in parenthesis, of a particular rotational speed of the shaft. As will be explained in greater detail subsequently, these numbers of teeth, and shaft speeds, are by way of example only, and apply only to one particular alternative embodiment of the present invention. The overall arrangement and configuration shown in FIG. 4 is applicable to all embodiments of the invention.

As was described in the BACKGROUND OF THE SPECIFICATION, the conventional axle assembly includes a ring and pinion (right-angle drive), with the inter-wheel differential being disposed on the "output" side of the ring and pinion combination. By way of contrast, in the present invention, the relatively high speed, low torque input is transmitted by the input shaft 19 to the inter-wheel differential 23, where the "torque-sharing" and the separation between the torque paths occurs. One half of the input torque is then transmitted by the side gear 31 to the spur gear 35, while the other half of the torque is transmitted by the side gear 37 to the spur gear 47. As may best be seen in FIG. 4, the engagement of spur gears 35 and 49 provides a gear reduction (speed decrease, torque increase) of approximately 2:1, and similarly, the engagement of the spur gears 47 and 51 provides a gear reduction of approximately 2:1. As may best be seen in FIG. 4, although the gears 35 and 49, and 47 and 51 are illustrated and described as spur gears, such is not an essential feature of the invention. Instead, in view of the overall configuration illustrated herein, the primary requirement is that each pair of gears comprise a parallel-axis gear set, capable of providing whatever gear reduction, if any, is desired.

After the gear reduction at the spur gears 35 and 49, the first torque path continues through the pinion shaft 53 to the engagement of the pinion gear 73 and ring gear 89. Similarly, after the gear reduction at the spur gears 47 and 51, the second torque path continues through the pinion shaft 63 to the engagement of the pinion gear 75 and ring gear 91. As was mentioned in the BACKGROUND OF THE SPECIFICATION, it is a particular advantage of the present invention that half of the torque is transmitted through the pinion 73 and ring gear 89, while the other half of the torque is transmitted through the pinion gear 75 and ring gear 91. As is well known to those skilled in the art, the torque capacity of a gear is generally proportional to the physical volume of the gear. Therefore, because each ring gear 89 or 91 of the present invention transmits only half of the final output torque, each ring gear is required to be only about one half the volume which would be required for a ring gear to transmit the entire output torque of the axle assembly. As a result, each of the ring gears 89 and 91, as well as the bearing sets 97, 99, 105, and 107 which support the ring gears, can be much smaller and less expensive than would be required in the conventional axle assembly.

As may be seen in FIG. 4, one feature of the present invention is the symmetry of the overall configuration and the fact that various elements of which two are required are identical. For example, the spur gears 49 and 51, the pinion shafts 53 and 63, the pinion gears 73 and 75, and the ring gears 89 and 91 can all be identical, and therefore, the same part number. However, in the subject embodiment, the spur gears 35 and 47 are different, although both could have the same overall diameter, pitch diameter, circular pitch, etc.

Referring still primarily to FIG. 4, it should be noted that the axle shafts 95 and 103 define a common axis of rotation A because they are typically substantially co-axial. The forward pinion shaft 53 and pinion gear 73 define a first drive pinion axis A1, while the rearward pinion shaft 63 and pinion gear 75 define a second drive pinion axis A2. As may best be seen in FIGS. 1 and 4, the side gears 31 and 37 and the forward output shaft 33 and rearward output shaft 41 cooperate to define an output gear axis A3. Finally, the stub shafts 27 define a pinion shaft axis A4, oriented generally perpendicular to the output gear axis A3.

Referring now primarily to FIG. 4, it may be seen that the first and second drive pinion axes A1 and A2 are equally and oppositely spaced relative to the output gear axis A3 (although both are below the axis A3, as may best be seen in FIG. 3). Next, the combination of the spur gears 35 and 49, the pinion gear 73, and the ring gear 89 is arranged, generally in a "mirror image" about the axis of rotation A, relative to the combination of the spur gears 47 and 51, the pinion gear 75, and the ring gear 91. The relationship is referred to as being "generally" a mirror image, rather than a perfect mirror image, only because it is not an essential feature of the present invention that the mirror image relationship exist, or if it does, that the relationship comprise a perfect mirror image. However, it is an important aspect of the present invention that the invention makes it possible to for the various gears to be arranged in enough of a mirror image, to make it possible for the various torques and reaction forces to be "balanced", i.e., disposed equally and oppositely relative to the axis of rotation A or the pinion shift axis A4.

Preferably, there is one desired deviation from the symmetry and mirror image relationship illustrated and described. As will be understood by those skilled in the gear art, it is preferred that the gear mesh between the pinion gear 73 and ring gear 89 be out of phase with the gear mesh between the pinion gear 75 and ring gear 91. Such an out of phase relationship will insure that the dynamic pulses generated as the gears go through the gear mesh will not be "additive", i.e., that the pulse between the gears 73 and 89 will not be a maximum at the same time that the pulse between the gears 75 and 91 is a maximum. The benefit of the desired out-of-phase relationship is to minimize generated noise. In the conventional axle assembly, with one hundred percent of the torque being transmitted through a single pinion gear-ring gear combination (operating at a single mesh frequency), there is the opportunity to generate the greatest amount of noise. However, with the present invention, an out of phase relationship of the pinion gear-ring gear combinations occurs most of the time, inherently, because of the presence of the differential 23. Whenever the two pinion gear-ring gear combinations are out-of-phase, only fifty percent of the torque is transmitted through each pinion gear-ring gear combination.

It is one of the primary advantages of the present invention that the provision of two different torque paths, and two gear sets (and therefore, potentially two different gear ratios) in each path offers many opportunities for dynamic load reduction and noise reduction. For example, the likelihood of out-of-phase gear meshes can be increased by putting the forward spur gear 49 at an angular relationship to the pinion gear 73, which is different than the angular relationship of the rearward spur gear 51 to the pinion gear 75. Similarly, the spur gear 35 can be put at an angular relationship to the side gear 31, which is different than the angular relationship of the side gear 37 to the spur gear 47.

In another alternative embodiment, noise could be minimized by providing different gear mesh frequencies for the two pinion gear-ring gear combinations. By way of example only, if the pinion gear 73 has ten teeth, and the ring gear 89 has 39 teeth (a 3.9 ratio) and the spur gears 35 and 49 have the same number of teeth (for a 1:1 ratio), then the overall ratio for that torque path is 3.9. On the other hand, if the pinion gear 75 has ten teeth and the ring gear 91 has 37 teeth (for a 3.7 ratio), the spur gears 47 and 51 could be selected to provide a gear ratio of approximately 1.054, such that the overall gear ratio for that torque path would also be 3.9.

Referring now again to FIG. 4, and this time referring as well to the indication of the number of teeth and shaft speeds, another way to minimize noise is to have different mesh frequencies by permitting some differential action to occur at the differential 23, i.e., the side gears 31 and 37 have different rotational speeds. In this embodiment, the pinion gear 73 and ring gear 89 would have the 3.9 ratio, while the pinion gear 75 and ring gear 91 would have the 3.7 ratio, as described in the previous example. Also, as in the previous example, the spur gears 35 and 39 could both have 29 teeth (for a 1.0 ratio), but the difference in this alternative embodiment from the previous embodiment would be that the spur gear 47 would have 30 teeth while the spur gear 51 would have 33 teeth (for a 1.10 ratio). Then, assuming that the shaft 19 has an input speed of 797 rpm, the forward output shaft 33 would have a speed of 780 rpm, while the rearward outward shaft 41 would have a speed of 814 rpm. As is well known to those skilled in the art, 780 rpm plus 814 rpm, divided by two, equals 797 rpm. With the shaft 33 having a speed of 780 rpm, the forward pinion shaft 53 would also have a speed of 780 rpm, and dividing that speed by the 3.9 ratio would yield an output for the axle shaft 95 of 200 rpm. With the shaft 41 at 814 rpm, the rearward pinion shaft 63 would rotate at 740 rpm (814×30/33). This speed of 740 rpm for the shaft 63, divided by the 3.7 ratio, would yield an output speed for the axle shaft 103 of 200 rpm.

With the above-described arrangement, the difference in speed between the side gears 31 and 37 would be equal to only about 4.2 percent of the input speed, e.g., in the above example, a difference of about 33 rpm. The potential for noise reduction provided by the alternative embodiment described above may be better appreciated by reference to the table below, which indicates, in the last column ("MESH FREQUENCY") the variety of mesh frequencies (in cycles per second) which would occur in the embodiment just described.

| GEARS | TEETH | MESH FREQUENCY |
| --- | --- | --- |
| 73, 89 | 10, 39 | 130 |
| 35, 49 | 29, 29 | 377 |
| 31, 29 | 16, 10 | 4.53 |
| 75, 91 | 10, 37 | 123.3 |
| 47, 51 | 30, 33 | 407 |
| 37, 29 | 16, 10 | 4.53 |

Referring again to the primary embodiment, as originally described in connection with FIG. 4, another advantage of the present invention is the ability to "change" gear ratios. Assuming again that all of the similar gears (e.g., spur gears 49 and 51), have the same number of teeth, pitch, etc., it would be possible to manufacture a certain number of axle assemblies having a particular overall gear ratio. Subsequently, it would be possible to manufacture a certain number of axle assemblies having a different overall gear ratio merely by replacing the spur gears 35 and 49, and the spur gears 47 and 51 with other spur gears which would provide a different overall gear ratio for the axle assembly, without any other change being made in any part of the axle assembly. In other words, in the two different manufacturing runs of axle assemblies, all parts would be common (i.e., same part, same part number, etc.), except for the four spur gears 35, 49, 47, and 51.

From the foregoing specification, it may be seen that the axle assembly of the present invention provides a number of advantages and accomplishes the objects set forth in the BACKGROUND OF THE DISCLOSURE. The axle assembly of the present invention makes it possible to use a smaller, less expensive, interwheel differential gear set than would be required if the differential were disposed "downstream" of the pinion gear-ring gear reduction, and would thus be subjected to a substantially greater torque (by a ratio of about 3.7 or 3.9 in the preceding examples).

The axle assembly of the present invention also makes it possible to use substantially smaller pinion gears, ring gears, and bearings than would be required in the conventional axle assembly. Finally, there are substantial advantages in the symmetrical, mirror image arrangement of the various gears and shafts of the axle assembly of the present invention, resulting in a symmetrical, mirror image relationship of the two torque paths.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. An axle assembly of the type including independently rotatable, generally co-axial first and second axle shafts, defining an axis of rotation (A); first and second ring gear means, being mounted concentric to said axis of rotation (A) and operable to drive said first and second axle shafts, respectively; first and second drive pinion gears in meshing engagement with said first and second ring gear means, respectively; a differential gear means including at least one input pinion gear in driven relationship with an input means and first and second output gears in meshing engagement with said input pinion gear; said first output gear being operable to transmit torque to said first drive pinion gear through a first parallel axis gear set, and said second output gear being operable to transmit torque to said second drive pinion gear through a second parallel axis gear set; said first and second parallel axis gear sets defining first and second gear ratios, respectively, said first and second parallel axis gear sets being readily replaceable by third and fourth parallel axis gear sets, respectively, said third and fourth parallel axis gear sets having third and fourth gear ratios, said third and fourth said gear ratios being different than said first and second gear ratios, to change the overall gear ratio of said axle assembly without any other substantial change of said axle assembly.

2. An axle assembly as claimed in claim 1, characterized by said first and second ring gear means comprising substantially identical first and second ring gear members, and said first and second drive pinion gears are substantially identical and define first (A1) and second (A2) drive pinion axes, said drive pinion axes being substantially parallel to each other.

3. An axle assembly as claimed in claim 2, characterized by said first (A1) and second (A2) drive pinion axes being arranged substantially in a mirror image relative to said axis of rotation (A) defined by said axle shafts.

4. An axle assembly as claimed in claim 2, characterized by, at any given instant, said first ring gear member and said first drive pinion gear define a first tooth mesh, and said second ring gear member and said second drive pinion gear define a second tooth mesh, said first and second tooth meshes being out of phase.

5. An axle assembly as claimed in claim 1, characterized by said differential gear means comprises a plurality of substantially identical input pinion gears in meshing engagement with said first and second output gears, said first and second output gears being substantially identical, and defining a common output gear axis (A3) of rotation.

6. An axle assembly as claimed in claim 5, characterized by said output gear axis (A3) of rotation being disposed substantially perpendicular to said axis of rotation (A) defined by said axle shafts.

7. An axle assembly as claimed in claim 5, characterized by said differential gear means comprises a pinion shaft having its axis (A4) of rotation perpendicular to, and intersecting, said output gear axis (A3) of rotation, said plurality of input pinion gears being mounted on said pinion shaft for rotation about said axis (A4) of rotation.

8. An axle assembly as claimed in claim 7, characterized by said input means being in operable, driving relationship with said pinion shaft to transmit full input drive torque to said pinion shaft.

9. An axle assembly as claimed in claim 8, characterized by said input means comprising an input shaft disposed in driving engagement with said pinion shaft and having its axis of rotation coincidental with said output gear axis (A3) of rotation.

10. An axle assembly as claimed in claim 9, characterized by said input shaft extending axially through, and being surrounded by, said second output gear.

11. An axle assembly as claimed in claim 1, characterized by said first parallel axis gear set and said second parallel axis gear set being substantially identical, and being arranged generally in a mirror image relative to said axis of rotation (A).

12. An axle assembly as claimed in claim 1, characterized by said first parallel axis gear set having first numbers of gear teeth and said second parallel axis gear set having second numbers of gear teeth, said first and second numbers of gear teeth being different.

13. An axle assembly as claimed in claim 1, characterized by said first output gear, said first drive pinion gear, said first ring gear means, and said first axle shaft defining a first torque path; said second output gear, said second drive pinion gear, said second ring gear means, and said second axle shaft defining a second torque path; and said first and second torque paths being arranged generally in a mirror image relative to said axis of rotation (A).

14. An axle assembly as claimed in claim 13, characterized by said first drive pinion gear and said first ring gear means having first numbers of gear teeth, and said second drive pinion gear and said second ring gear means having second numbers of gear teeth, said first and second numbers of gear teeth being different.

15. An axle assembly of the type including independently rotatable, generally co-axial first and second axle shafts; first and second ring gear means operable to drive said first and second axle shafts, respectively; first and second drive pinion gears in meshing engagement with said first and second ring gear means, respectively; a differential gear means including at least one input pinion gear in driven relationship with an input means and first and second output gears in meshing engagement with said input pinion gear; said first output gear being operable to transmit torque to said first drive pinion gear through a first parallel axis gear set, and said second output gear being operable to transmit torque to said second drive pinion gear through a second parallel axis gear set; said first parallel axis gear set has a first gear ratio R1, and said second parallel axis gear set has a second gear ratio R2; and said first drive pinion gear and said first ring gear means has a first reduction ratio r1, and said second drive pinion gear and said second ring gear means has a second reduction ratio r2.

16. An axle assembly as claimed in claim 15, characterized by the product of said first ratio R1 and said first reduction ratio r1 is equal to the product of said second ratio R2 and said second reduction ratio r2.

17. An axle assembly as claimed in claim 15, characterized by said first ratio R1 being different than said second ratio R2, and said first reduction ratio r1 being different than said second reduction ratio r2.

18. An axle assembly as claimed in claim 15, characterized by said first and second axle shafts having a speed S; said first output gear having a speed S1 equal to the product of said speed S, said first ratio R1, and said first reduction ratio r1; and said second output gear having a speed S2 equal to the product of said speed S, said second ratio R2, and said second reduction ratio r2; said speed S1 being different than said speed S2.

19. An axle assembly as claimed in claim 15, characterized by said first ratio R1 is different than said second ratio R2; and said first reduction ratio r1 is equal to said second reduction ratio r2.

20. An axle assembly as claimed in claim 15, characterized by said first ratio R1 is equal to said second ratio R2; and said first reduction ratio r1 is different than said second reduction ratio r2.

21. An axle assembly of the type including rotatable, generally co-axial first and second axle shafts defining an axis of rotation (A); first and second ring gear means being mounted concentric to said axis of rotation (A) and operable to drive said first and second axle shafts, respectively; first and second drive pinion gears in meshing engagement with said first and second ring gear means, respectively, said first and second drive pinion gears defining axes of rotation (A1) and (A2), respectively, said axes of rotation (A), (A1), and (A2) lying in a common horizontal plane, defining a first, relatively lower gear level; a differential gear means including at least one input pinion gear in driven relationship with an input means, and first and second output gears in meshing engagement with said input pinion gear, said first and second output gears defining an axis of rotation (A3) defining a second, relatively higher gear level; said first output gear being operable to transmit torque to said first drive pinion gear through a first parallel axis gear set including one gear rotatable about said axis of rotation (A3) and another gear rotatable about said axis of rotation (A1); and said second output gear being operable to transmit torque to said second drive pinion gear through a second parallel axis gear set including one gear rotatable about said axis of rotation (A3) and another gear rotatable about said axis of rotation (A2).

* * * * *